UNITED STATES PATENT OFFICE.

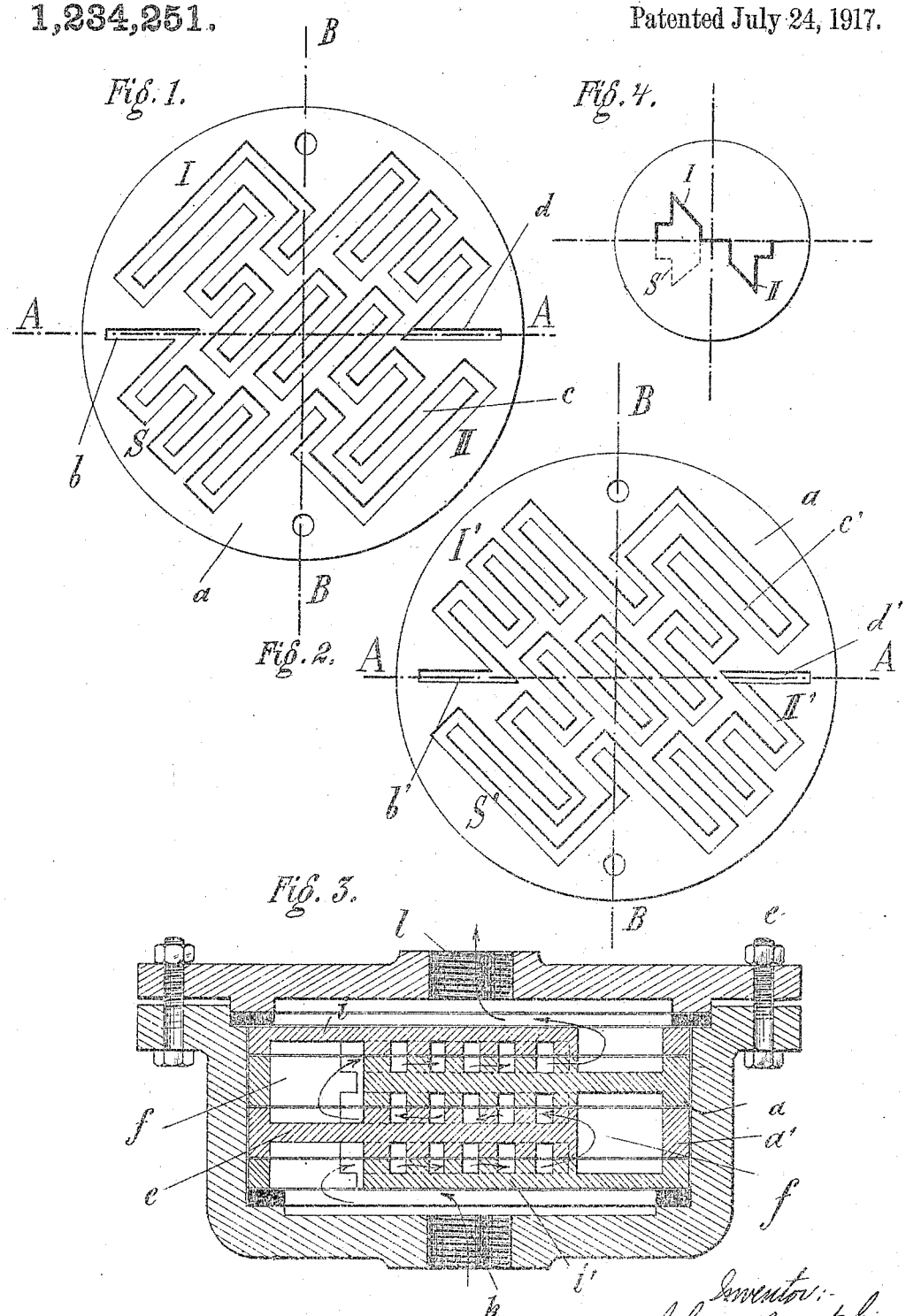

JOHANN ZORZYTZKI, OF BISMARCKHÜTTE, GERMANY.

STEAM-TRAP.

1,234,251.  Specification of Letters Patent.  Patented July 24, 1917.

Application filed October 3, 1916. Serial No. 123,545.

*To all whom it may concern:*

Be it known that I, JOHANN ZORZYTZKI, a subject of the German Emperor, residing at Bismarckhütte, O/S, Germany, have invented certain new and useful Improvements in Steam-Traps, of which the following is a specification.

The present invention relates to steam traps composed of a plurality of superimposed plates having labyrinth steam passages, and consists essentially in the feature that the inner plates have the said labyrinth steam passages disposed on both faces in such a manner that one face presents the appearance of the other in a mirror. This arrangement produces the advantage over other known systems, that the assembling and dismantling of the steam trap is greatly facilitated, as it is immaterial which side of said inner plates is the upper and which the lower.

A further feature of the invention consists in the peculiar disposition of said labyrinth passages on the two sides of the plates, whereby, as hereinafter will be more fully described, the assembling is further simplified.

In the accompanying drawing

Figures 1 and 2 are bottom and top view, respectively of a steam trap plate.

Fig. 3 is a cross section through a complete steam trap.

Fig. 4 is a diagram illustrating the configuration of the labyrinth passages.

On the two sides of the plates 1 (Figs. 1, 2, 3) are disposed labyrinth passages $b$, $c$, $d$ (Fig. 1) and $b'$, $c'$, $d'$ (Fig. 2), respectively, in such a manner that the passages on one side of the plate represent the mirror reflection of the passages on the other side of the plate. The ports $d$, $d'$ leading to and from the passages, respectively communicate with each other by means of a passage $f$ cut into the intermediate partition $e$.

As shown in the diagram, Fig. 4, the passages are disposed in such a manner, that one half of the passage I (or I', respectively) on one side of the diameter of the plate A—A is the mirror reflection S (or S' respectively) of the other half (II) of the passage turned through an angle of 180° on the diameter B—B at right angles to diameter A—A. In consequence of this construction in assembling the said plates, it is immaterial which side of the plates is the upper and which the lower, so that the fitter need turn the plates, in assembling them, merely into the proper plane; this, obviously greatly facilitates the assembling of the steam trap.

The inner plates ($a$, $a'$) are disposed in the manner shown in Fig. 3 in a casing between two plates having the corresponding labyrinth passages on one face only, $i$, $i'$. The steam enters at $k$ into the steam trap, flows along the path indicated by the arrows and escapes at $l$.

I claim:

1. A steam trap composed of a plurality of superimposed plates having labyrinth steam passages, the inner ones of said plates having said passages disposed on both faces, the passage on one face resembling the mirror reflection of the passage on the other face.

2. A steam trap composed of a plurality of superimposed plates having labyrinth steam passages, one half of such passage on one side of a diameter of the plate being the mirror reflection of the other half of the passage turned through an angle on 180° on a plate diameter at right angles to the first mentioned diameter, the inner plates having said steam passages on both faces, the passage on the one face resembling the mirror reflection of the passage on the other face.

In testimony whereof I affix my signature in presence of two witnesses.

JOHANN ZORZYTZKI.

Witnesses:
 LON H. KATZ,
 SIEGFRIED LUSTIG.

Copies of this patent may be obtained for five cents each, by addressing the "Commissioner of Patents, Washington, D. C."